May 28, 1963   J. D. WILKINS ETAL   3,091,070
CORN HARVESTER
Filed Jan. 27, 1960
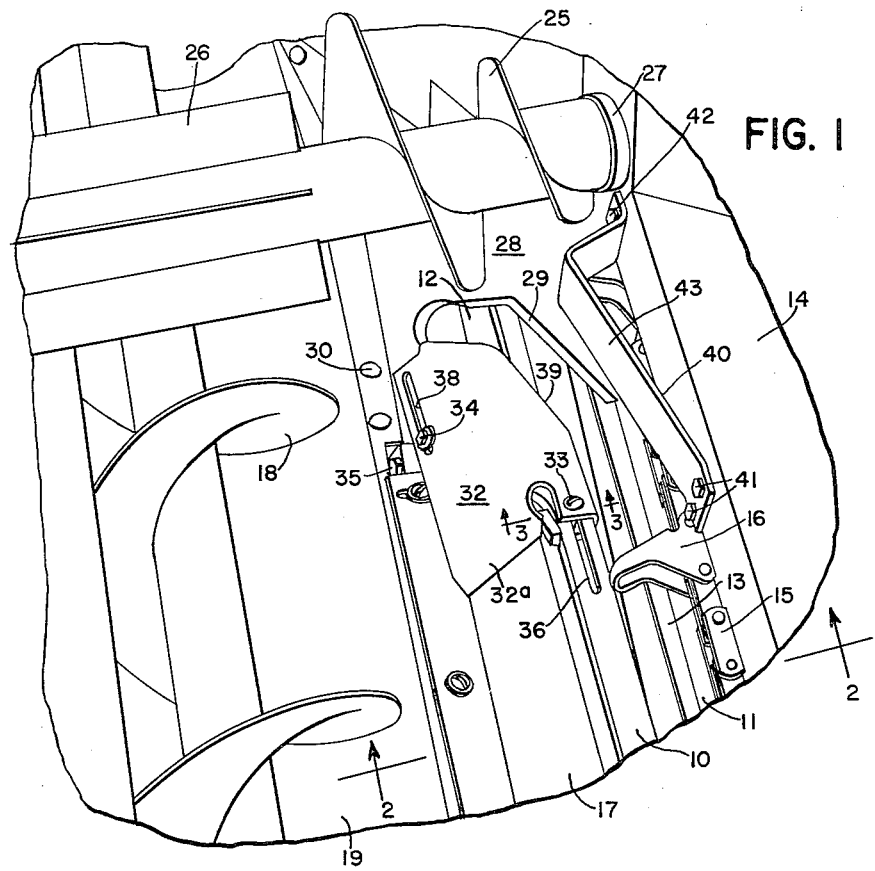
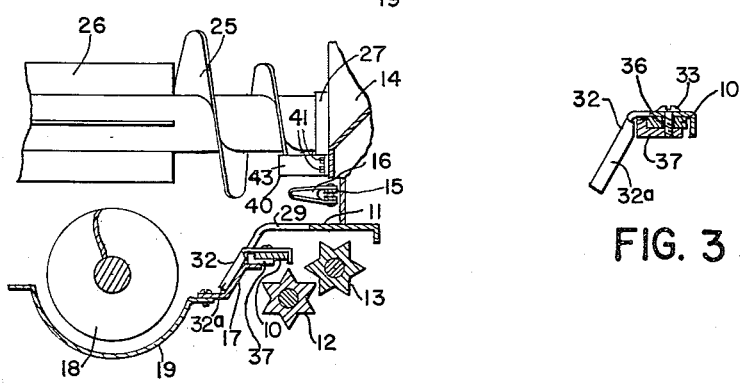
FIG. 2
INVENTORS
J.D. WILKINS &
F.D. JONES
BY
C.F. Parker and W.A. Murray
ATTORNEYS United States Patent Office 3,091,070
Patented May 28, 1963

3,091,070
CORN HARVESTER
James D. Wilkins and Frank D. Jones, Moline, Ill., assignors to Deere & Company, Moline, Ill., a corporation of Delaware
Filed Jan. 27, 1960, Ser. No. 4,931
8 Claims. (Cl. 56—18)

This invention relates to a corn picker and more particularly relates to an improvement in a corn picker which facilitates the removal of trash and material which normally creates a clogging condition in the picker or harvester.

Generally speaking, the present invention pertains to an improvement in the corn harvester attachment shown and described in U.S. Patent 2,794,307 issued to Charles S. Morrison, Henry H. Dennison, and Frank D. Jones and will operate to advanage in the structure shown and described in U.S. Patent 2,946,170 issued to Sidney E. Anderson. Both of the latter structures show and describe a corn picker attachment which operates in combination with a conventional type combine. However, it should be understood the present improvement would be adaptable to other types of corn harvesters, and could also be utilized in connection with the other type crop harvesters.

In the conventional type of corn harvester there is provided housing structure which defines a fore-and-aft extending stalk passage which receives the corn stalks as the harvester moves forwardly over the field. Longitudinally extending harvester rolls are positioned on opposite sides of the passage and contact the stalks to draw them downwardly until the ears come in contact with the harvesting mechanism for detachment from the stalks. Normally the ears are transferred to one side of the harvesting mechanism to be fed into a side conveyor which conveys them to a treating unit either in the form of a husking mechanism or a shelling mechanism, which is capable of receiving and passing considerable trash without effecting the treating operation.

It has been a problem in corn harvesters to eliminate plugging of the harvester rolls either by husks or other trash wrapping around the rolls or by the stalks being broken off above the rolls and operating as a restriction against the material moving from front to rear in the stalk passage. In the past various methods have been incorporated to eliminate this trash either by improving the upper end of the rolls to more aggressively grip material or by providing some type of trash remover above the rear end of the rolls. Generally the more aggressive the means, the more premature shelling of corn occurs. Since it is determined that a considerable amount of trash may be moved through a combine or treating unit without effecting the shelling of the corn there is some advantage in effecting movement of some of the trash into the combine, and to have less aggressive means adjacent the upper ends of the rolls.

Therefore, it is the primary object of the present invention to provide with a harvester and particularly for use with a corn harvester a transverse auger means positioned above and adjacent the rear end of the stalk passage for effecting movement of material in a direction of movement to one side of the passage or to the conveyor which feeds the material to the crop treating unit. In combination with the transverse auger means it is proposed to provide other structural means which will define a continuation of the stalk passage in a rearward and diagonal direction so that the plants or stalks moving through the passage will be directed to the aforesaid side of the stalk passage. It is still further proposed to provide abutment means spaced above the passage which will operate to guide the upper portion of the plant or stalks to the side conveyor.

Other objects and advantages of the present invention will become apparent to those skilled in the art as the nature of the invention is better understood from the following description and as shown in the accompanying drawings.

FIG. 1 is a front and top perspective view showing a portion of a corn harvester which is adjacent the upper end of the harvester rolls.

FIG. 2 is a sectional view taken substantially along the line 2—2 of FIG. 1.

FIG. 3 is a sectional view taken substantially along the line 3—3 of FIG. 1.

The invention presently to be described may best be operated in combination with a corn harvester attachment of the type now shown and described in the aforementioned U.S. Patent 2,946,170. Structure is provided forming a fore-and-aft extending stalk passage and includes a pair of oppositely disposed snapping bars 10, 11 on opposite sides of the stalk passage so as to permit passage of the stalks between them in a fore-and-aft direction. There is supported on the structure and beneath the snapping bars 10, 11 harvesting mechanism in the form of a pair of harvester rolls 12, 13 which are oppositely disposed and operate so that the adjacent sides move downwardly and draw the stalks downwardly until the ears on the stalks contact the snapping bars 10, 11 and are detached from the stalks. Side sheeting, such as at 14, guides the stalks into the harvesting area and also prevents ears from leaving the harvester prior to their collection. Positioned above the passage defined by the snapping bars 10, 11 is a conventional type gathering chain 15 having outwardly extending lugs 16 which contact the stalks moving through the passage and urge them in a rearward direction. Positioned on the opposite side of the stalk passage is downwardly inclined paneling 17 which permits gravitation of the ears detached by the snapping bars 10, 11 into a side conveyor or auger 18. An auger trough 19 operates in conjunction with the auger 18 and through a combination of both operates to move the ears to a rearwardly positioned crop treating unit, not shown, which in the present instance would be a combine.

Spacedly above the rear end of the snapping mechanism is transverse auger means including an auger section 25 which delivers material inwardly and a transverse beater 26 which operates in conjunction with the fore-and-aft extending auger 18 to move material rearwardly. The transverse auger is suitably journaled at 27 to the main structure of the harvester and is driven by suitable means, not shown. Details for mounting and driving the transverse beater is shown and described in the aforementioned Anderson patent and consequently will not be described in the present application. The auger 25 is tapered from a relatively small end above the stalk passage to a relatively large end above the auger trough 19.

Structural means in the form of a laterally disposed panel 28 is supported on the harvester structure beneath the transverse auger means 25 and has a forwardly disposed edge 29 extending diagonally. The panel member 28 is suitably riveted at 30 to the harvester structure. The forward edge 29 extends downwardly and diagonally across the inner harvester roll 12 and defines one edge of a rearward extension of the stalk passage. It operates in conjunction with the auger 25 to guide stalks and ears of corn inwardly to the fore-and-aft extending conveyor 18.

A second panel structure 32 is positioned inwardly of and adjacent the rear end of the stalk passage formed by the snapping bars 10, 11. The panel 32 is mounted on the snapping bar 10 by means of a pair of bolts 33, 34 and has a forward depending flange 32a having its lower edge against the panel 17. As may be seen by viewing FIG. 1, the snapping bar 10 is curved inwardly at its rear end and is connected to the harvester frame by a bolt 35. Adjacent the forward end of the panel 32, the bar 10 is provided with a slot 36 which receives the bolt 33. Positioned beneath the snapping bar 10 is a lock nut 37 which has an upward flange riding against the inner edge of the bar 10 to prevent loosening of the bolt 33. The bolt 34 is provided with a similar arrangement for fixing the panel 32 to the snapping bar 10. In the latter, however, the panel 32 is provided with a slot 38 through which the bolt 34 extends. The slots 36, 38 obviously permit the panel 32 to be moved longitudinally relative to the direction of travel so as to permit the space between the panel 32 and the forward edge 29 to be adjusted to various size stalks and field conditions.

The panel 32 has a rear edge 39 which is diagonally disposed relative to the stalk passage and is in opposed relation to the forward edge 29. The edges 39, 29 operate therefore as a diagonally extending continuation or extension of the fore-and-aft extending passage formed by the snapping bars 10, 11.

A diagonally extending abutment in the form of a metal strap 40 is bolted at 41, 42 to a vertically disposed flange on side sheets or panels 14. The abutment strap 40 has a diagonally exposed contact portion or surface 43 which extends from a forward end at one side of the stalk passage diagonally rearwardly to the rear end of the opposite side on the passage. The strap 40 is disposed above the rearward continuation of the stalk passage formed by the edges 29, 39, and is spacedly above the snapping bars 10, 11. Viewing FIGS. 1 and 2, it becomes apparent that the stalks being moved rearwardly by the chain lugs 16 and which have not departed the harvester through the downward movement created by the harvester rows 12, 13 will move into contact with the abutment formed by the surface 43 and by the edge 29 and will be guided inwardly either to gravitate into the auger trough 19 or to move into contact with the transverse auger 25 which will forcibly move them inwardly to the trough 19. Due to the diagonal disposition of the portions or edges 43, 29 the movement inwardly of the stalks and corn will be gradual so that the lug 16 will not cause hairpinning or wrapping around the edge 29. Also, the edges 29, 39 will tend to guide the stalks and ears downwardly in the direction of the auger trough 19. The auger 25, being tapered, will maintain contact with the ears and stalks as they are guided downwardly over the edge 29.

While only one form of the invention has been shown, it should be recognized that other forms and variations will occur to those skilled in the art. Therefore, it should be understood that while the present disclosure was shown and described in detail, it was so shown and described for the purpose of clearly and concisely illustrating the principles of the invention and was not intended to limit or narrow the invention beyond the broad concepts set forth in the appended claims.

What is claimed is:

1. A crop harvester comprising: a main frame, panel structure on the frame defining a plant passage for successively receiving plants as the harvester advances and including a portion thereof inclined transversely downwardly from an upper and forward fore-and-aft extending edge adjacent to and defining one edge of the passage, a further portion thereof having an edge defining a rearward continuation of said fore-and-aft extending edge and extending diagonally rearwardly and downwardly therefrom, and a further portion having a forward fore-and-aft extending edge in opposed relation to the aforesaid fore-and-aft extending edge and defining the other edge of the passage and a rear diagonally rearwardly and downwardly extending edge oppositely disposed to the aforesaid rearward continuation of said fore-and-aft extending edge, said oppositely disposed diagonal edges thereby defining a rear diagonal extension of said stalk passage; mechanism supported by the frame effecting harvesting of a crop beneath the panel structure including at least one fore-and-aft extending harvesting roll positioned beneath the rear diagonal extension of the passage; a conveyor trough structure on the frame and at one side of the stalk passage disposed to receive material gravitating over the downward inclined transverse portion of the panel structure; and a transverse auger supported by the frame disposed above the diagonal extension of the passage, said auger being tapered from a relatively small end above the extension to a relatively large end above the conveyor trough.

2. A crop harvester comprising: a main frame, panel structure on the frame defining a plant passage for successively receiving plants as the harvester advances and including a portion thereof inclined transversely downwardly from an upper and forward fore-and-aft extending edge adjacent to and defining one edge of the passage, a further portion thereof having an edge defining a rearward continuation of said fore-and-aft extending edge and extending diagonally rearwardly and downwardly therefrom, and a further portion having a forward fore-and-aft extending edge in opposed relation to the aforesaid fore-and-aft extending edge and defining the other edge of the passage and a rear diagonally rearwardly and downwardly extending edge oppositely disposed to the aforesaid rearward continuation of said fore-and-aft extending edge, said oppositely disposed diagonal edges thereby defining a rear diagonal extension of said stalk passage; mechanism supported by the frame effecting harvesting of a crop beneath the panel structure including at least one fore-and-aft extending harvesting roll positioned beneath the rear diagonal extension of the passage; and a conveyor trough structure on the frame and at one side of the stalk passage to receive material gravitating over the downward inclined transverse portion of the panel structure.

3. In a corn harvester having a pair of snapping bars defining a fore-and-aft extending stalk passage for successively receiving stalks of corn as the harvester advances and longitudinally extending harvesting mechanism effective to draw stalks downwardly between the bars, the improvement comprising structural means including a pair of spaced apart diagonally extending edges rigid with the aforesaid bars defining a rearwardly and diagonally extending continuation of the stalk passage to direct the material moving through the passage to one side of the harvesting mechanism.

4. The invention defined in claim 3 further characterized by the structural means forming the diagonal continuation of the stalk passage being adjustable whereby the continuation may be varied in its width.

5. In a corn harvester: supporting structure; a pair of fore-and-aft extending snapping bars on the structure spaced apart to define a fore-and-aft extending stalk passage that successively receives stalks of corn as the harvester advances; longitudinally extending and rotatable harvesting rolls disposed on opposite sides of the passage and effective to draw stalks downwardly through the bars; transverse auger means mounted on the structure above and adjacent the rear of the passage effecting movement of stalks in a direction of movement to one side of the passage; snapping bar extensions below the auger means rigid with said structure defining a rearward and diagonal continuation of the stalk passage to direct stalks moving through the passage to said one side of the passage; and abutment means rigid with the structure between the uger means and said continuation of the passage, said abutment means having a diagonally disposed contact portion directing material above the structure defining the passage toward the auger means and in the direction of movement effected by the auger means.

6. A corn harvester comprising: a main supporting frame; a pair of fore-and-aft extending rolls supported on the frame and spaced apart to receive successive stalks of a row as the harvester advances, the rolls being rotatable and effective to draw the stalks downwardly; a pair of snapping bar structures supported on the frame and having fore-and-aft extending portions above the rolls, the bar structures being spaced apart transversely to define a stalk passage generally above the spacing between the rolls, the snapping bar structures further having diagonally extending rear portions continuing from the fore-and-aft extending portions rearwardly and to one side of the rolls whereby stalks will be guided to the side of the rolls; a transverse auger supported on the frame above the rear portions of the snapping bar structures for driving stalks transversely to the aforesaid side of the rolls; and an abutment supported on the frame spacedly above the snapping bar structures and having a diagonally extending abutting portion for guiding the upper portions of the stalks toward the one side of the snapping rolls.

7. A corn harvester comprising: a main supporting frame; a pair of fore-and-aft extending rolls supported on the frame and spaced apart to receive successive stalks of a row as the harvester advances, the rolls being rotatable and effective to draw the stalks downwardly; a pair of snapping bar structures supported on the frame and having fore-and-aft extending portions above the rolls, the bar structures being spaced apart transversely to define a stalk passage generally above the spacing between the rolls, the snapping bar structures further having diagonally extending rear portions continuing from the fore-and-aft extending portions rearwardly and to one side of the rolls whereby stalks will be guided to the side of the rolls; and a transverse auger supported on the frame above the rear portions of the snapping bar structures for driving stalks transversely to the aforesaid side of the rolls.

8. A corn harvester comprising: a main supporting frame; a pair of fore-and-aft extending rolls supported on the frame and spaced apart to receive successive stalks of a row as the harvester advances, the rolls being rotatable and effective to draw the stalks downwardly; a pair of snapping bar structures supported on the frame and having fore-and-aft extending portions above the rolls, the bar structures being spaced apart transversely to define a stalk passage generally above the spacing between the rolls, the snapping bar structures further having diagonally extending rear portions continuing from the fore-and-aft extending portions rearwardly and to one side of the rolls whereby stalks will be guided to the side of the rolls; and an abutment supported on the frame spacedly above the snapping bar structures and having a diagonally extending abutting portion for guiding the upper portions of the stalks toward the one side of the snapping rolls.

References Cited in the file of this patent
UNITED STATES PATENTS

| | | |
|---|---|---|
| 2,264,565 | Coultas et al. | Dec. 2, 1941 |
| 2,525,481 | Flora | Oct. 10, 1950 |
| 2,912,812 | Aasland | Nov. 17, 1959 |
| 2,946,170 | Anderson | July 26, 1960 |